United States Patent
Aoki et al.

(10) Patent No.: US 7,466,220 B2
(45) Date of Patent: Dec. 16, 2008

(54) HEAD-UP DISPLAY APPARATUS AND MIRROR UNIT FOR THE SAME

(75) Inventors: Kunimitsu Aoki, Shizuoka (JP); Yoshiyuki Furuya, Shizuoka (JP); Hideaki Kageyama, Shizuoka (JP); Go Nakamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 204 days.

(21) Appl. No.: 11/129,298

(22) Filed: May 16, 2005

(65) Prior Publication Data

US 2005/0259301 A1 Nov. 24, 2005

(30) Foreign Application Priority Data

May 21, 2004 (JP) ............................. 2004-151760

(51) Int. Cl.
*B60Q 1/00* (2006.01)

(52) U.S. Cl. ................... 340/438; 340/945; 340/815.55; 359/850; 359/602

(58) Field of Classification Search ................. 340/438, 340/980, 945, 971, 459, 461, 425.5, 815.4, 340/815.55; 359/1, 13, 838, 630, 618, 850, 359/602; 348/113, 115
See application file for complete search history.

(56) References Cited

U.S. PATENT DOCUMENTS

| | | | | |
|---|---|---|---|---|
| 4,978,214 A | * | 12/1990 | Kawata | 353/114 |
| 5,237,455 A | * | 8/1993 | Bordo et al. | 359/632 |
| 5,394,203 A | * | 2/1995 | Murphy et al. | 353/13 |
| 5,457,575 A | * | 10/1995 | Groves et al. | 359/631 |
| 5,473,447 A | * | 12/1995 | Molteni et al. | 359/13 |
| 5,504,622 A | * | 4/1996 | Oikawa et al. | 359/630 |
| 5,506,595 A | * | 4/1996 | Fukano et al. | 345/7 |
| 5,563,620 A | * | 10/1996 | Terai | 345/7 |
| 5,708,410 A | * | 1/1998 | Blank et al. | 340/438 |
| 5,805,119 A | * | 9/1998 | Erskine et al. | 345/7 |
| 5,905,477 A | * | 5/1999 | Kuwayama et al. | 345/7 |
| 6,795,237 B1 | * | 9/2004 | Marinelli et al. | 359/353 |

FOREIGN PATENT DOCUMENTS

JP 2002-331855 * 11/2002

* cited by examiner

*Primary Examiner*—Daniel Previl
(74) *Attorney, Agent, or Firm*—Kratz, Quintos & Hanson, LLP (57) ABSTRACT

Providing a head-up display apparatus capable of receiving a mirror, which projects from a line of an instrument panel when in use, without increasing a receiving section and spoiling a beauty of the instrument panel, and a mirror unit used in the same, a mirror is rotated about an axis perpendicular to a reflecting surface of the mirror so as to project a part of the mirror from the opening when in use, and take in the projected part of the mirror down within the opening when not in use. Thus, the whole mirror can be received in the receiving section only by rotational motion.

5 Claims, 7 Drawing Sheets

HEAD-UP DISPLAY APPARATUS AND MIRROR UNIT FOR THE SAME

The priority application Number Japan Patent Application No. 2004-151760 upon which this patent application is based is hereby incorporated by reference.

BACKGROUND OF THE INVENTION

1. Field of the Invention

This invention relates to a head-up display apparatus installed in a vehicle and a mirror unit used therefor, especially, a head-up display apparatus, which is installed in an instrument panel and includes a mirror for reflecting an image of a display device toward a windshield, and a mirror unit used for the same.

2. Description of the Related Art

Figure 2A:
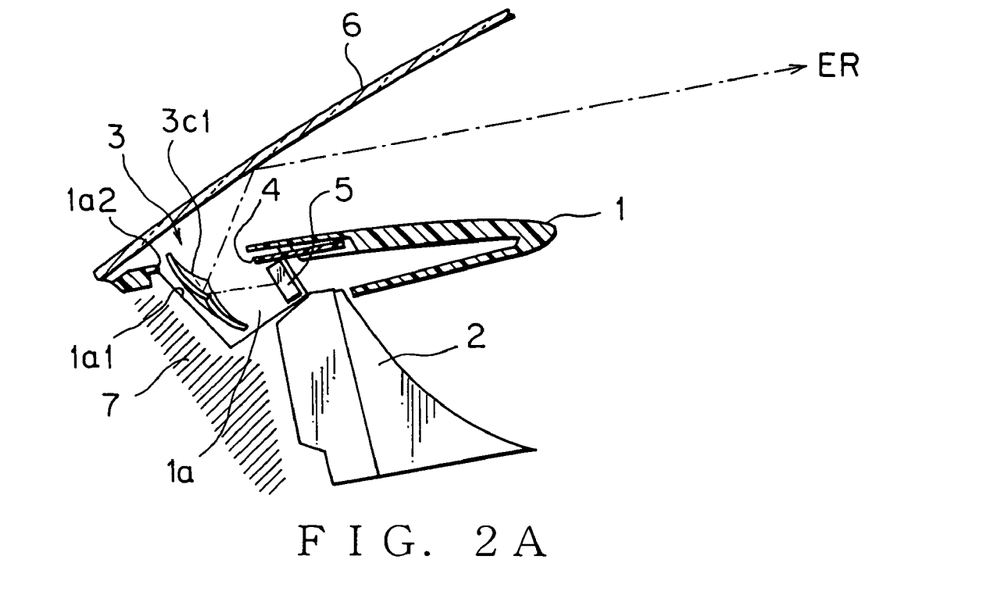
FIG. 2A is an illustration showing the head-up display apparatus in a condition when in use.

A head-up display apparatus, which reflects an image of a display device 5 installed in an instrument panel 1 toward a windshield 6 by a mirror 3c1 to make a vehicle driver recognize visually as shown in FIG. 2A, is installed in a vehicle. FIG. 2 is used for describing a related art, but is not a prior art.

A height of the instrument panel 1 is set a limit for safety. A space 7 in the instrument panel 1 is provided with many members, such as an air duct continuing to an air conditioner, reinforcing parts, wiring harnesses and the like.

The mirror 3c1 must be placed in the vicinity of the windshield 6 according to a shape or an angle of the windshield 6. In case, by reason of a height limit of the instrument panel 1, the mirror 3c1 must be placed to project a part of the mirror 3c1 from a line of the instrument panel 1 when in use.

Preferably, the mirror 3c1 of the head-up display apparatus is covered and protected from dust when not in use, mainly daytime. Therefore, a member for covering and protecting from dust the mirror 3c1 when not in use is required. Preferably, moving the whole mirror 3c1 downward in parallel and pushing the mirror 3c1 into the instrument panel 1, an upper area is covered by a cover. As mentioned above, number of members received in the instrument panel 1 is increasing, so that there is no space in the instrument panel for pushing the whole mirror 3c1 into the instrument panel.

Therefore, by reason of height limit of the instrument panel 1 and increasing members received in the instrument panel 1, the mirror 3c1 is placed at a position when in use, and the mirror 3c1 must be covered and protected from dust when not in use.

An example of a head-up display apparatus having a mirror reflecting an image of a display device for displaying a predetermined image toward a windshield is disclosed in a patent reference 1; Japan Patent 2002-331855.

SUMMARY OF THE INVENTION

Objects to be Solved

For placing the mirror 3c1 at a position when in use, and covering and protecting from dust the mirror 3c1 when not in use, a cover having a shape covering an opening of a receiving section 1a, that is, covering the part of the mirror 3c1 projecting from the line of the instrument panel is required.

If such cover is used, a part of a top surface of the instrument panel 1 projects when not in use. Thereby, the line of the instrument panel is out of shape and the look thereof becomes bad. A space for receiving the cover with such shape is required when in use.

To overcome the above problem, objects of this invention are to provide a head-up display apparatus capable of receiving the mirror, which projects from the line of the instrument panel when in use, without spoiling a beauty of the instrument panel, and a mirror unit used in the same.

How to Attain the Object of the Present Invention

In order to attain the object of the present invention, a head-up display apparatus according to an aspect of the present invention includes a display device displaying a predetermined image; an optical system reflecting the image toward a windshield; a receiving section being installed in an instrument panel and capable of receiving the display device and the optical system; a panel cover covering an opening of the receiving section; and a control mechanism for the optical system, projecting a part of the optical system from the receiving section to make a car driver sitting on a driver's seat recognize the image when in use, and taking in the projected part of the optical system within the receiving section when not in use to make the car driver ignore the image.

According to above structure, the part of the optical system is projected from the receiving section to make the car driver recognize the image when in use, and the projected part of the optical system is taken within the receiving section when not in use to make the car driver ignore the image. Thus, by disassembling an optical system to disregard making the car driver recognize the image, the receiving section is not increased.

A head-up display apparatus according to another aspect of the present invention includes a display device displaying a predetermined image; a mirror reflecting the image toward a windshield; a receiving section being installed in an instrument panel for receiving the display device and the mirror; a panel cover covering an opening of the receiving section; and a mirror rotating mechanism for rotating the mirror about an axis perpendicular to a reflecting surface of the mirror so as to project a part of the mirror from the opening of the receiving section when in use, and take in the projected part of the mirror down within the opening when not in use.

According to above structure, the mirror is rotated about the axis perpendicular to the reflecting surface of the mirror so as to project the part of the mirror from the opening of the receiving section when in use, and take in the projected part of the mirror down within the opening when not in use. Thus, the whole mirror can be received in the receiving section only by rotational motion, so that a drive mechanism for receiving the mirror becomes simple. Instead of pushing the whole mirror into the instrument panel, the mirror is received in the instrument panel by rotational motion, so that the receiving section is not increased.

The head-up display apparatus according to another aspect of the present invention is characterised in that the panel cover is formed into a shape of flat plate, and made movable in parallel to the opening interlockingly with rotation of the mirror for covering the opening so as to be in the same plane with the instrument panel when not in use.

According to above structure, the panel cover covers the opening of the receiving section so as to be in the same plane with the instrument panel when not in use. The panel cover is formed into a shape of flat plate, and made movable interlockingly with rotation of the mirror.

The head-up display apparatus according to another aspect of the present invention further includes an eye-range adjusting mechanism capable of adjusting an angle of the mirror corresponding to an eye-range when in use according to a position in height of the eye-range of a car driver sitting on a driver's seat.

According to above structure, the angle of the mirror can be adjusted corresponding to the position in height of the eye-range of the car driver sitting on the driver's seat.

A mirror unit, which is used for a head-up display apparatus having a receiving section to be installed in an instrument panel and capable of receiving a display device for displaying a predetermined image and the mirror for reflecting said image toward a windshield, according to another aspect of the present invention includes; a mirror rotating mechanism for rotating the mirror about an axis perpendicular to a reflecting surface of the mirror; and a fixed unit, on which the mirror rotating mechanism is mounted, being fixed on a inner wall of a receiving section so as to project a part of the mirror from an opening of the receiving section when in use, and take in the projected part of the mirror down within the opening when not in use.

According to above structure, the mirror is rotated about the axis perpendicular to the reflecting surface of the mirror so as to project the part of the mirror from the opening of the receiving section when in use, and take in the projected part of the mirror down within the opening when not in use. The mirror is received in the instrument panel by rotational motion, so that the receiving section is not increased.

The above and other objects and features of this invention will become more apparent from the following description taken in conjunction with the accompanying drawings.

DESCRIPTION OF THE PREFERRED EMBODIMENT

Figure 1:
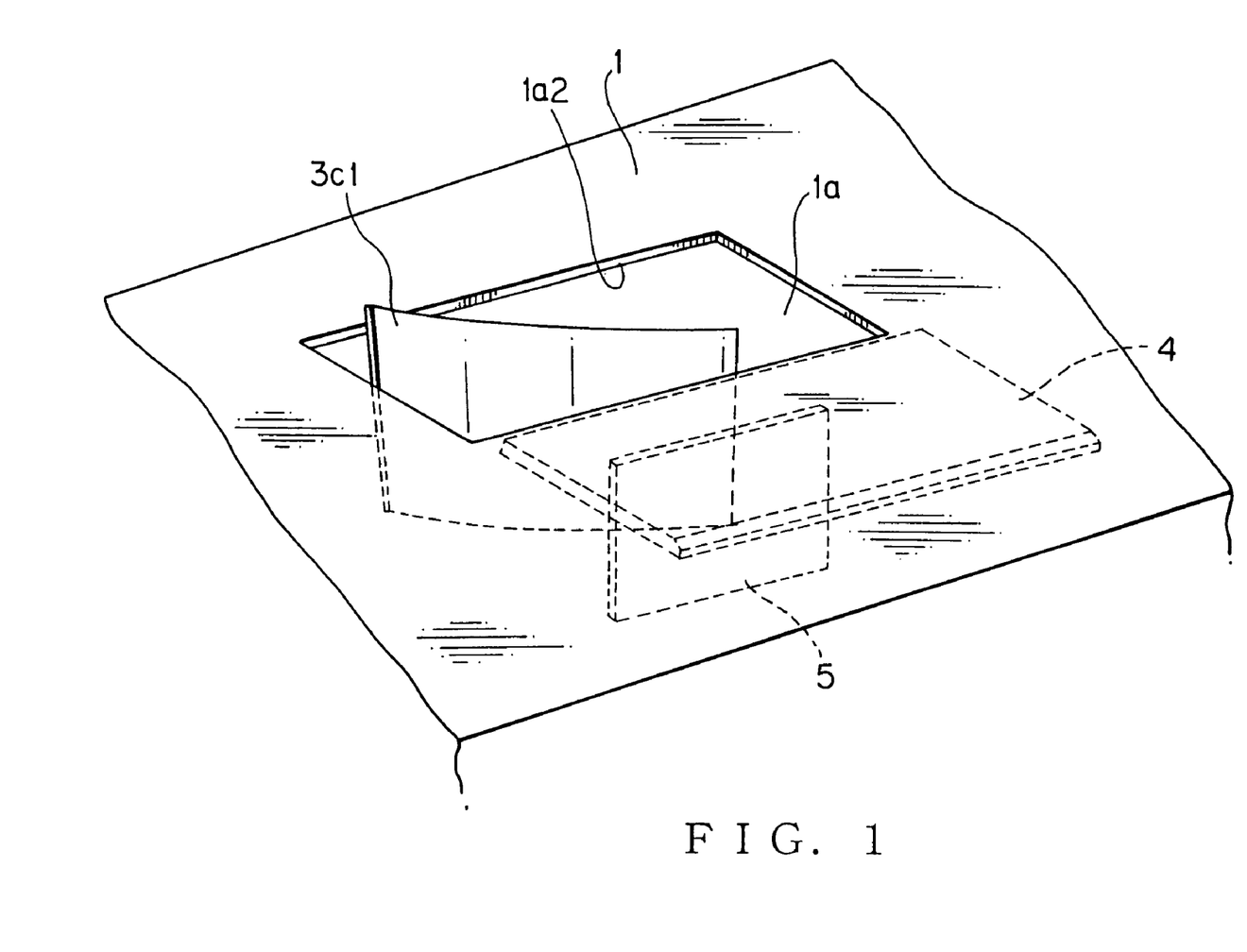
FIG. 1 is a perspective view of an embodiment of a head-up display apparatus according to the present invention.
Figure 2B:
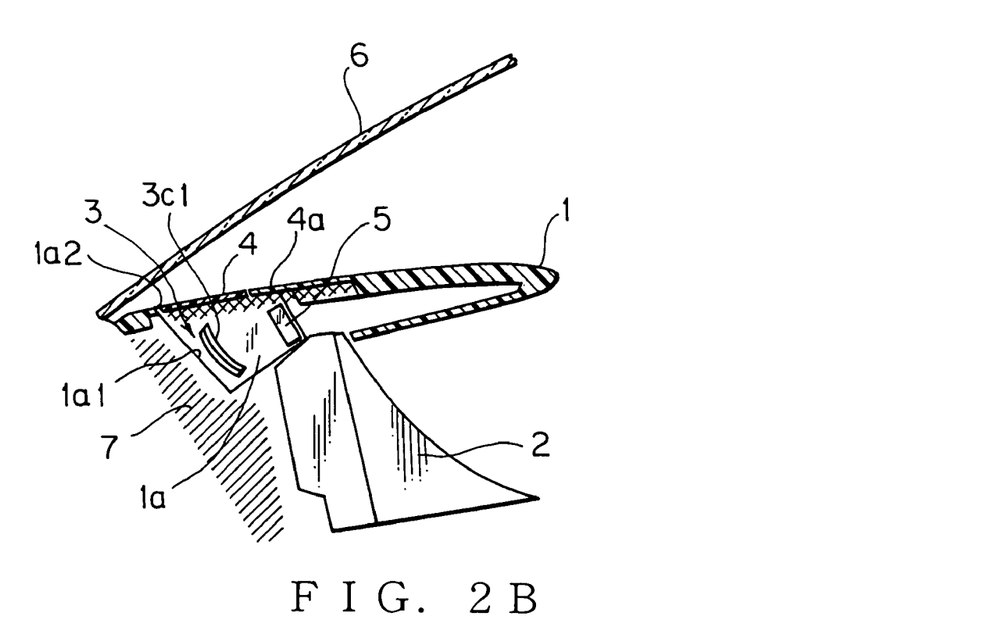
FIG. 2B is an illustration showing the head-up display apparatus in a condition when not in use.

A head-up display apparatus of an embodiment according to the present invention is described with reference to FIGS. 1, 2. FIG. 1 is a perspective view of the head-up display apparatus. FIG. 2A is an illustration showing the head-up display apparatus when in use. FIG. 2B is an illustration showing the head-up display apparatus when not in use. FIG. 1 corresponds to the head-up display apparatus when in use.

As shown in FIGS. 1, 2A, a receiving section 1a of the head-up display apparatus is installed in an instrument panel 1 of a front area of a vehicle. The receiving section 1a is formed into a rectangular box shape and an inner wall of the receiving section 1a is plate-like. The instrument panel 1 is cut off at a top surface of the receiving section into a rectangular shape to form an opening 1a2. The instrument panel 1 of the front area of the vehicle is provided with a combination meter 2, in which a speed meter, a tachometer and the like are integrated, facing to a driver sitting on a driver's seat.

A display device 5 structured with a liquid-crystal display for displaying a predetermined image is mounted in the receiving section 1a. A spherical magnifying mirror 3c1 (called simply by mirror, corresponding to an optical system) is placed on an inner wall 1a1 of the receiving section 1a opposing to a display surface of the display device 5 so as to face to the display surface. The magnifying mirror 3c1 is formed spherically according to a shape and positional relation of a windshield 6 so as to make the image of the display device 5 give an elect image for the driver. The mirror 3c1 is placed with a small slant when in use as shown in FIG. 1. A later-described mirror unit 3 includes the magnifying mirror 3c1.

A panel cover 4 is mounted slidably at the opening 1a2 of the receiving section 1a. The panel cover 4 has the same color as the instrument panel 1, and the same flat shape as the opening 1a2. The panel cover 4 moves interlockingly with rotational motion of the mirror 3c1 so as to open the opening 1a2 completely when in use as shown in FIGS. 1, 2A and close the opening 1a2 to be in a plane of the instrument panel 1 when not in use. The panel cover is the same color as the instrument panel and covers the opening 1a2 to be in the plane of the instrument panel 1 when not in use, so that the panel cover does not spoil a beauty of the instrument panel when not in use. The panel cover 4 is flat and moves slidably interlocking with the rotational motion of the mirror 3c1, so that it has effective space factor.

The part of the mirror 3c1 projects from the opening 1a2 when in use, as shown in FIGS. 1, 2A. In this condition, the image of the display device 5 is reflected by the slant mirror 3c1 projecting the part thereof from the opening 1a2 toward the windshield 6 and reflected by the windshield 6 toward an eye-range of the driver. Thereby, the driver can see both a view in front of the vehicle through the windshield 6 and the image reflected by the windshield 6.

The part of the mirror 3c1, which projects when in use, moves down into the opening 1a2 when not in use, and the whole mirror 3c1 is received in the receiving section 1a as shown FIG. 2B. The panel cover 4 is mounted at the opening 1a2 so as to be in a plane of the instrument panel 1. Displacement of the mirror 3c1 between when in use and when not in use is according to rotational motion about an axis perpendicular to a reflecting surface of the mirror 3c1. 4a in FIG. 2B shows a moving area of the panel cover 4.

Figure 3A:
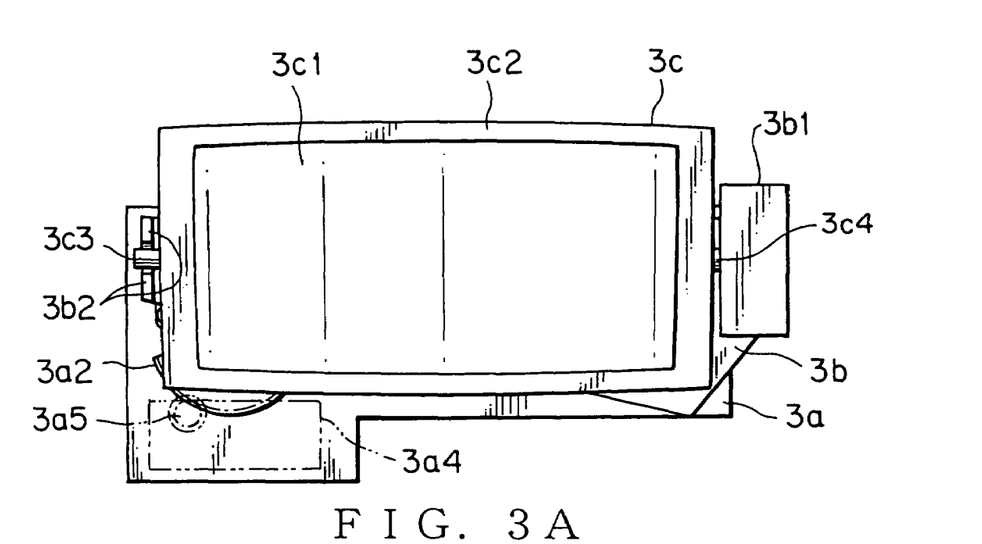
FIG. 3A is a front view of a whole mirror unit of the embodiment.
Figure 3B:
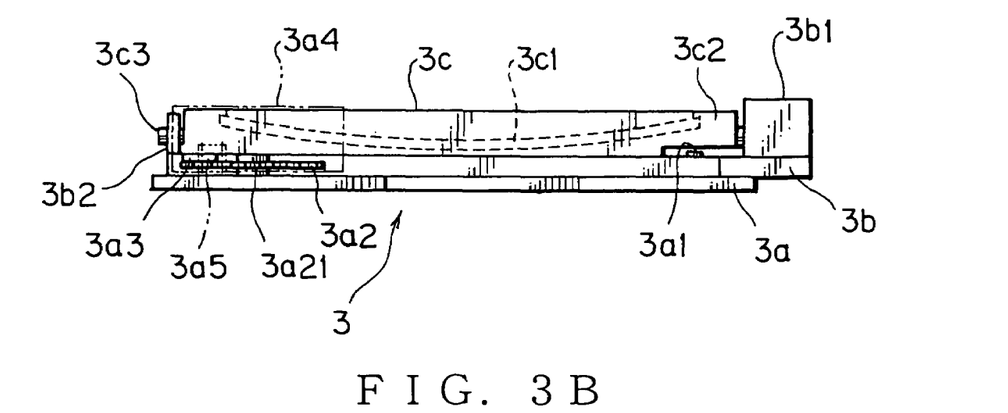
FIG. 3B is a side view of the whole mirror unit of the embodiment.
Figure 4A:
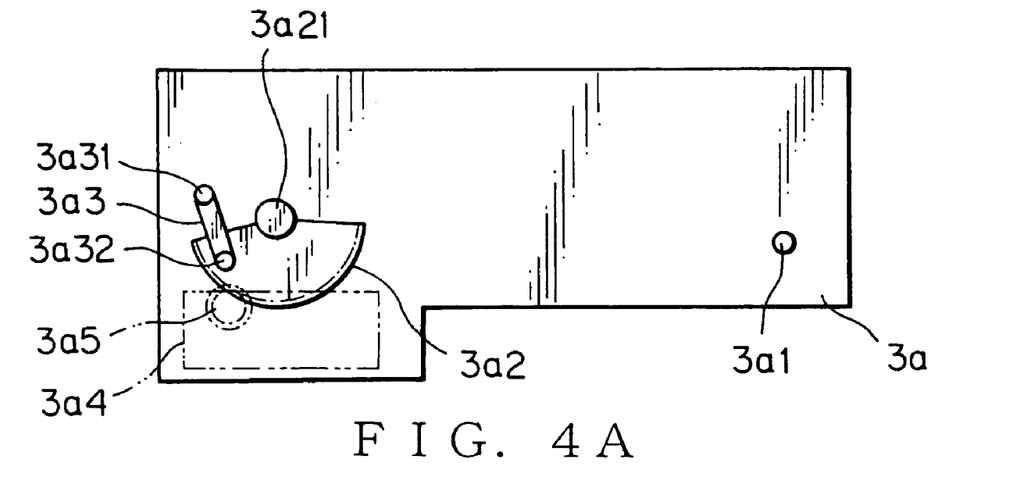
FIG. 4A is a front view of a fixed unit of the mirror unit in FIG. 3A.
Figure 4B:
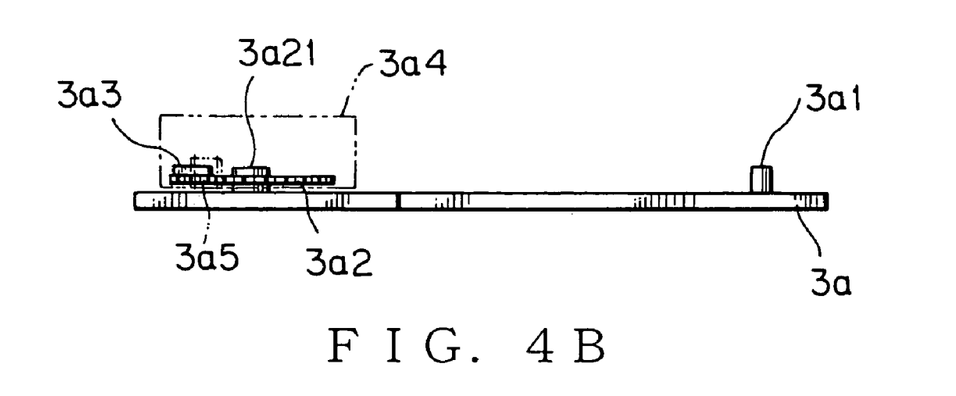
FIG. 4B is a side view of the fixed unit of the mirror unit in FIG. 3B.
Figure 5A:
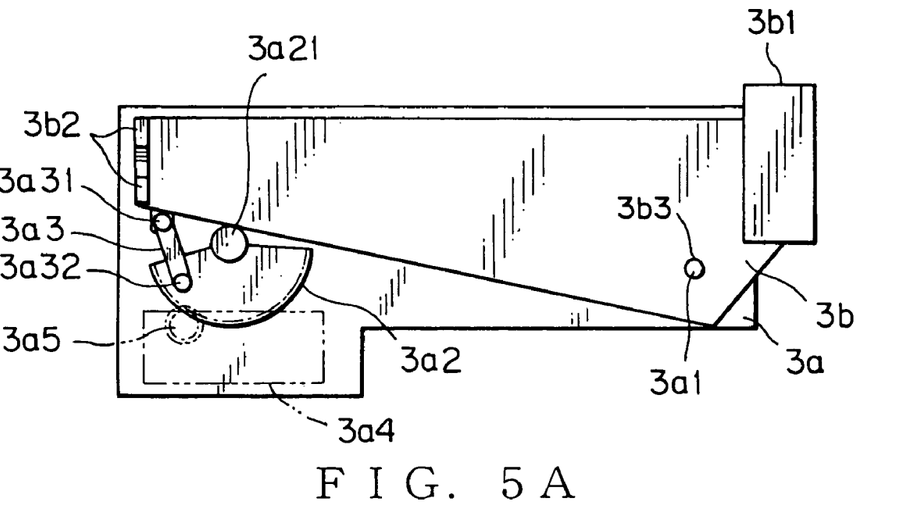
FIG. 5A is a front view of the fixed unit and a holder unit of the mirror unit in FIG. 3A.
Figure 5B:
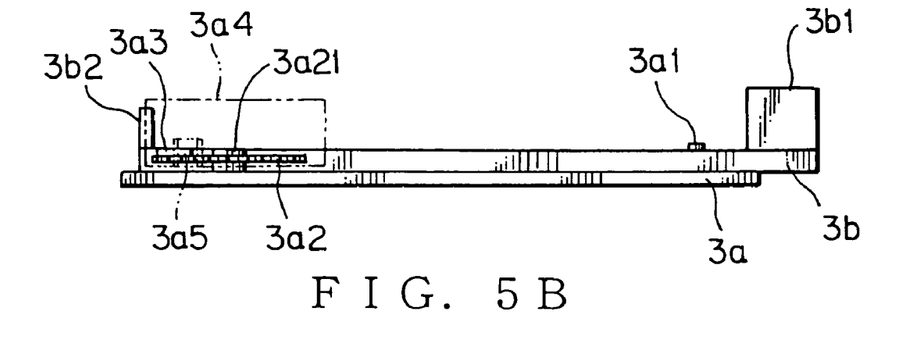
FIG. 5B is a side view of the fixed unit and the holder unit of the mirror unit in FIG. 3B.

Structure of the mirror unit 3 used in the head-up display apparatus of the embodiment according to the present invention is described with reference to FIGS. 3A, 3B, 4A, 4B, 5A and 5B. FIG. 3A is a front view of the whole mirror unit of the embodiment according to the present invention. FIG. 3B is a side view of the whole mirror unit. FIG. 4A is a front view of a fixed unit of the mirror unit in FIG. 3A. 4B is a side view of the fixed unit of the mirror unit in FIG. 3A. FIG. 5A is a front view of the fixed unit and a holder unit of the mirror unit in FIG. 3A. FIG. 5B is a side view of the fixed unit and the holder unit of the mirror unit in FIG. 3A.

The mirror unit 3 includes a fixed unit 3a, a holder unit 3b and a mirror assembly 3c as shown in FIG. 3A. The mirror unit 3 is mounted so as to make the fixed unit 3a aligned along the inner wall 1a1 of the receiving section 1a.

The fixed unit 3a is plate-like as shown in FIGS. 3A, 3B, 4A, 4B, 5A and 5B. The fixed unit 3a includes a pin 3a1, a fan-shape gear 3a2, an arm 3a3, a motor gear box 3a4 and a pinion 3a5. The fixed unit 3a is mounted so as to make a surface of the fixed unit 3a, on which the motor gear box is not mounted, aligned along the inner wall 1a1 of the receiving section 1a.

The pin 3a1 is the rotation axis of the mirror 3c1. The pin 3a1 is inserted into a hole 3b3 of the later-described holder unit 3b. The fan-shape gear 3a2 rotates in a predetermined angle about an axis 3a21 by receiving rotating force of a motor installed in the motor gear box 3a4 through the pinion 3a5. A rotational motion of the fan-shape gear 3a2 is transmitted through the arm 3a3 connected by pins 3a31, 3a32 to the holder unit 3b.

The holder unit 3b is plate-like as shown in FIGS. 3A, 3B, 5A and 5B. The holder unit 3b includes a motor gear box 3b1, a bearing unit 3b2, and a hole 3b3. The motor gear box 3b1 includes inside thereof a motor and gears for rotating the mirror assembly 3c mounted on the holder unit 3b. A rotation axis 3c3 of the mirror assembly 3c is provided at the bearing unit 3b2. The pin 3a1 of the fixed unit 3a is inserted into the hole 3b3 so as to rotate the fixed unit 3a about the pin 3a1.

The mirror assembly 3c includes a magnifying mirror 3c1, a mirror holder 3c2 and rotation axes 3c3, 3c4 as shown in FIGS. 3A, 3B. The magnifying mirror 3c1 is a spherical concave mirror, and is held by the mirror holder 3c2. The mirror holder 3c2 is a frame structure having a rectangular opening slightly smaller than an external shape of the magnifying mirror 3c1. The rotation axis 3c3 is placed at one short side surface of the mirror holder 3c2, and mounted on the bearing unit 3b2 of the holder unit 3b.

The rotation axis 3c4 is placed at the other short side surface of the mirror holder 3c2, and inserted into the motor gear box 3b1 mounted on the holder unit 3b. Thereby, the mirror assembly 3c can rotate with a predetermined angle by receiving the rotating force from the motor gear box 3b1. Therefore, an angle of the mirror assembly 3c can be adjusted corresponding to an eye-range of each driver. The pin 3a1, the fan-shape gear 3a2, the arm 3a3 correspond to the mirror rotating mechanism. The motor gear box 3a4 and the pinion 3a5 correspond to the control mechanism for the optical system. The motor gear box 3b1, bearing unit 3b2, rotation axes 3c3 and 3c4 correspond to the eye-range adjust mechanism.

Figure 6A:
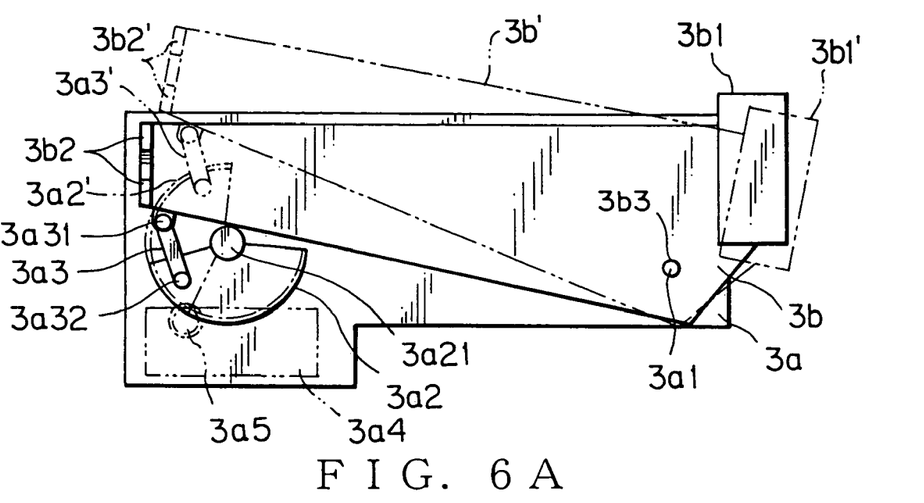
FIG. 6A is a front view, showing actions of the fixed unit and the holder unit of the mirror unit.
Figure 6B:
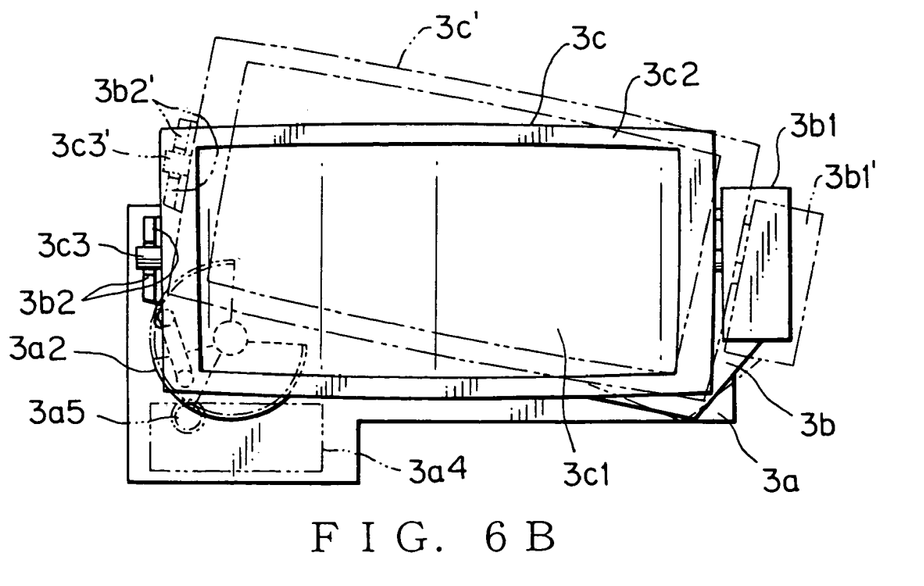
FIG. 6B is a front view, showing actions of the whole mirror unit.

Actions of the mirror unit 3 are described with reference to FIGS. 6A and 6B. FIG. 6A is a front view showing actions of the fixed unit and the holding unit of the mirror unit 3. FIG. 6B is a front view showing actions of the whole mirror unit 3. In FIGS. 6A, 6B, a solid line shows a condition when not in use and a dotted line shows a condition when in use.

In the condition when not in use shown with a solid line, when a predetermined operation of switching to shift to the condition when in use is acted, the motor in the motor gear box 3a4 rotates correspondingly, and the rotating force is transmitted through the pinion 3a5 to the fan-shape gear 3a2. The fan-shape gear 3a2 rotates about the axis 3a21 to be in the condition when in use shown by 3a2'. According to the rotational motion of the fan-shape gear 3a2, the arm 3a3 pushes the holding unit 3b upward in FIG. 6A. Thereby, the holding unit 3b rotates about the axis 3a1 to be in the condition when in use shown by 3b'. As a result, the mirror assembly 3c mounted on the holder unit 3b moves to the condition when in use shown by 3c'.

Oppositely, in the condition when in use shown with the dotted line in FIGS. 6A and 6B, when a predetermined operation of switching to shift to the condition when not in use is acted, the motor in the motor gear box 3a4 rotates in a reverse direction, the mirror assembly 3c' moves to be in the condition when not in use shown by 3c, according to actions opposed to above. 3b1' and 3b2' in FIGS. 6A, 6B show the motor gear box 3b1 and the bearing unit 3b2 in the condition when not in use.

Actions of the mirror unit 3 mounted in the receiving section 1a are described with reference to FIGS. 7A, 7B, 7C and 7D. FIGS. 7A-7D are illustrations showing actions of the mirror unit 3 of the embodiment.

Figure 7A:
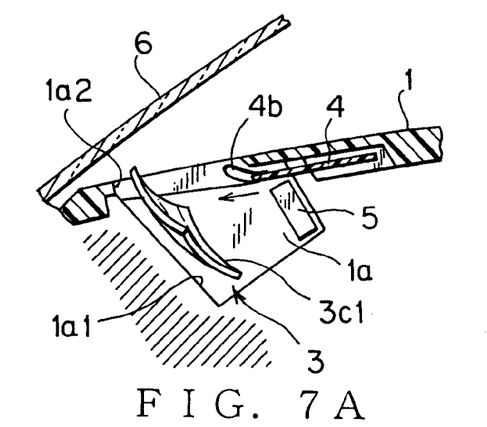
FIGS. 7A, 7B, 7C, 7D are illustrations showing actions of the mirror unit of the embodiment.

As shown in FIG. 7A, the mirror assembly 3c when in use is secured in a condition that the part of the mirror 3c1 projects from the opening 1a2. The mirror unit 3 is in the condition shown with the dotted line in FIG. 6B. In the condition, the panel cover 4 is received below the instrument panel 1 to open the opening 1a2 completely.

Figure 7B:
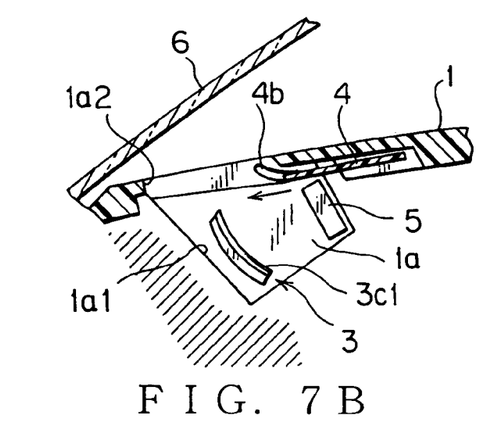

In this condition, when the predetermined operation of switching to shift to the condition when not in use is acted, the part of the mirror 3c1, which projects when in used, moves into the opening 1a2, and the whole mirror 3c1 is received in the receiving section 1a as shown in FIG. 7B. The detailed actions of the mirror unit 3 is explained above with reference to FIGS. 6A and 6B. The mirror unit 3 is shown with the solid line in FIG. 6B.

Figure 7C:
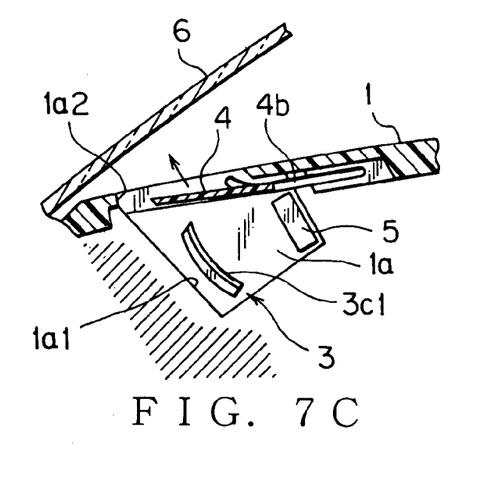
Figure 7D:
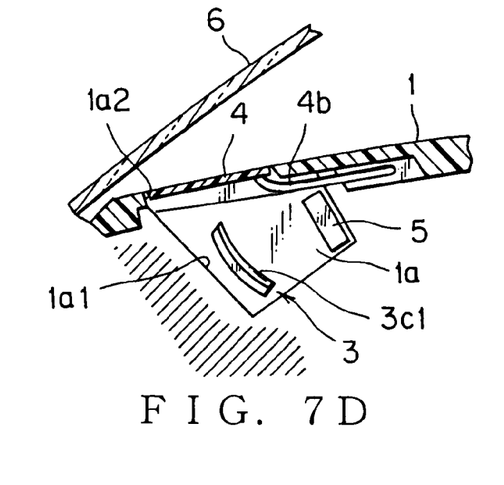

Thereafter, the panel cover 4 guided by a slide groove 4b moves forward to close the opening 1a2 gradually as shown in FIGS. 7B and 7C, and moves upward. Finally, the panel cover 4 is placed to cover the opening 1a2 completely in the condition when not in use as shown in FIG. 7D. When the panel cover 4 is placed to cover the opening 1a2, the panel cover is in the plane of the instrument panel 1. Rotating force of a motor (not shown) performs the actions of the panel cover 4.

Oppositely, in the condition when not in use as shown in FIG. 7D, when the predetermined operation of switching to shift to the condition when in use is acted, the mirror unit 3 and the panel cover 4 moves through conditions of FIGS. 7C and 7B to a condition shown in FIG. 7A according to reverse actions to the above mentioned actions.

According to the above actions, the panel cover 4 starts to move after the action of mirror unit 3 is completed. These actions can be performed simultaneously under a requirement that the action of the panel cover 4 does not obstruct the rotating action of the mirror unit 3.

As mentioned above, according to embodiments of the present invention, since the projected part of the optical system is taken within the receiving section when not in use to make the car driver ignore the image, that is, to disassemble an optical system, the receiving section is not increased. Especially, the whole mirror can be received in the receiving section only by rotational motion, so that the drive mechanism for receiving the mirror becomes simple. Instead of pushing the whole mirror into the instrument panel, the mirror is received in the instrument panel by rotational motion, so that the receiving section for receiving the whole mirror 3c1 in the instrument panel is not increased. Thereby, the panel cover, apart of which projects at a top surface of the instrument panel 1, is not required and the look thereof does not become bad.

In the mirror rotating mechanism and the eye-range adjust mechanism as shown in embodiment, many changes and modifications can be made without departing from the scope of the invention, and such modifications are included in the present invention.

What is claimed is:

1. A head-up display apparatus comprising:
a display device displaying a predetermined image;

an optical system reflecting said image toward a windshield to be reflected again by the windshield;

a receiving section being installed in an instrument panel at an opening of the instrument panel for receiving the display device and the optical system;

a panel cover to cover an opening of the receiving section as the opening of the instrument panel; and a control mechanism for the optical system, for positioning a part of the optical system from a position in the receiving section to make a car driver sitting on a driver's seat recognize the image when in use, and for positioning the part of the optical system within the receiving section when not in use to make the car driver ignore the image.

2. A head-up display apparatus comprising:

a display device displaying a predetermined image;

a mirror reflecting said image toward a windshield;

a receiving section being installed in an instrument panel for receiving the display device and the mirror;

a panel cover covering an opening of the receiving section; and a mirror rotating mechanism for rotating the mirror about an axis perpendicular to a reflecting surface of the mirror so as to position a part of the mirror from the opening of the receiving section when in use, and take in the part of the mirror down within the opening when not in use.

3. The head-up display apparatus according to claim 2, wherein said panel cover is formed into a shape of flat plate, and made movable in parallel to the opening interlockingly with rotation of the mirror for covering the opening so as to be in the same plane with the instrument panel when not in use.

4. The head-up display apparatus according to claim 2 or 3 further comprising an eye-range adjusting mechanism being capable of adjusting an angle of the mirror corresponding to an eye-range when in use according to a position in height of the eye-range of a car driver sitting on a driver's seat.

5. A mirror unit, which is used for ahead-up display apparatus having a receiving section to be installed in an instrument panel for receiving a display device for displaying a predetermined image and a mirror for reflecting said image toward a windshield, comprising;

a mirror rotating mechanism for rotating the mirror about an axis perpendicular to a reflecting surface of the mirror; and a fixed unit, on which the mirror rotating mechanism is mounted, being fixed on a inner wall of a receiving section so as to position a part of the mirror from an opening of the receiving section when in use, and take in the part of the mirror down within the opening when not in use.

* * * * *